United States Patent [19]

Bannister et al.

[11] 4,413,519

[45] Nov. 8, 1983

[54] TURBINE BLADE VIBRATION DETECTION APPARATUS

[75] Inventors: Ronald L. Bannister, Westtown; John M. Beatty, Aston, both of Pa.

[73] Assignee: Westinghouse Electric Corp., Pittsburgh, Pa.

[21] Appl. No.: 287,843

[22] Filed: Jul. 29, 1981

[51] Int. Cl.³ .............................................. G01H 3/04
[52] U.S. Cl. ....................................... 73/660; 73/655; 73/659
[58] Field of Search .................. 73/660, 657, 649, 655, 73/650, 659, 658; 343/12 R

[56] References Cited

U.S. PATENT DOCUMENTS

| | | | |
|---|---|---|---|
| 3,058,339 | 10/1962 | Shapiro | 73/660 |
| 3,289,073 | 11/1966 | Loeffler | 73/660 X |
| 3,597,963 | 8/1971 | Smejkal | 73/660 |
| 3,705,516 | 12/1972 | Reis | 73/660 X |
| 3,733,892 | 5/1973 | Rennick | 73/660 X |
| 3,879,988 | 4/1975 | Jacobs | 73/657 |
| 3,908,444 | 9/1975 | Peter | 73/655 |
| 3,929,008 | 12/1975 | Zlotin et al. | 73/660 |
| 3,973,259 | 8/1976 | Hellgren et al. | 343/12 R |
| 4,060,329 | 11/1977 | Ellis | 73/655 X |
| 4,080,823 | 3/1978 | Stargardter | 73/656 X |
| 4,213,346 | 7/1980 | Polounikou et al. | 73/660 |
| 4,335,600 | 6/1982 | Wu et al. | 73/660 X |
| 4,346,383 | 8/1982 | Woolcoch et al. | 343/12 R |

Primary Examiner—Stephen A. Kreitman
Attorney, Agent, or Firm—D. Schron

[57] ABSTRACT

Turbine blade vibration detection apparatus having two or more extremely narrow beam radar sensors positioned to direct their radar signals towards predetermined blade row or rows. A blade identification circuit is provided for each blade row having an associated radar sensor for providing an output count indicative of which blade is being examined by a particular radar sensor. The gating of the blade count and radar sensor signals is governed by a computer which performs a frequency analysis of the radar signals and compares the result with predetermined threshold values.

11 Claims, 8 Drawing Figures

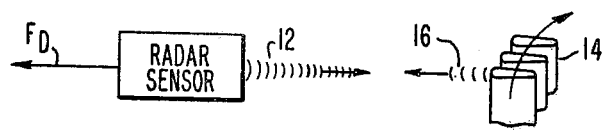
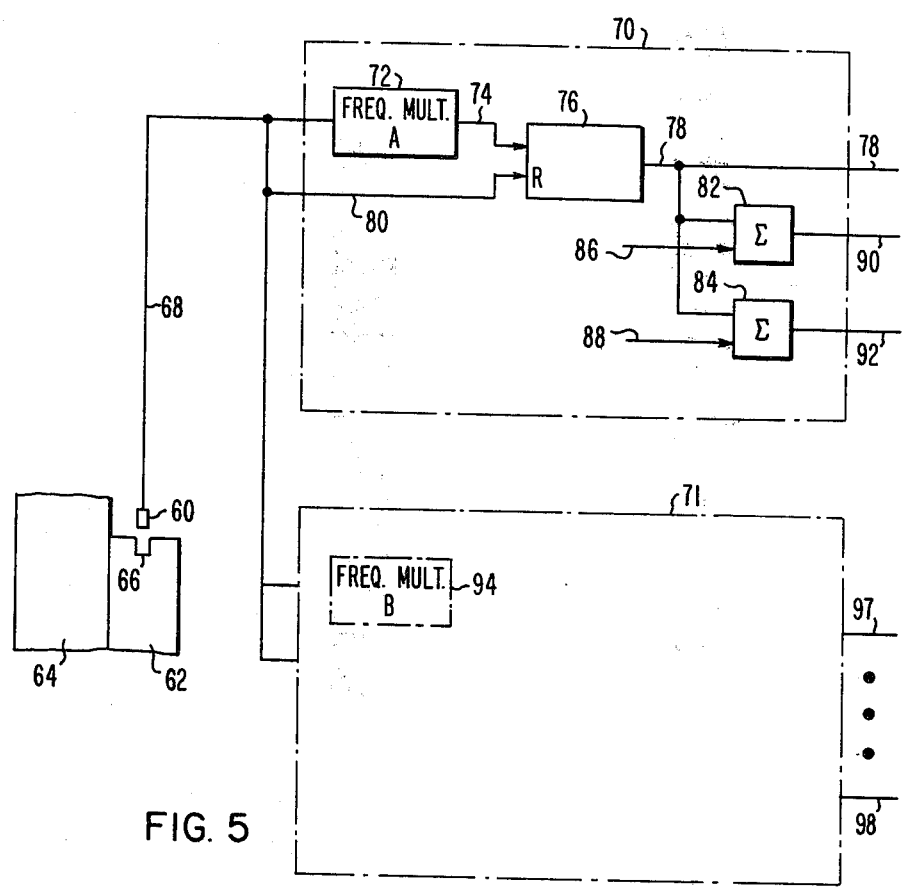

TURBINE BLADE VIBRATION DETECTION APPARATUS

BACKGROUND OF THE INVENTION

1. Field of the Invention

The invention in general relates to vibration analysis, and more particularly, to an arrangement for measuring any vibration in rotating turbine blades.

2. Description of the Prior Art

In the design and operation of a turbine, care must be taken to ensure that no turbine blades are set into vibration during rotation of the one or more blade rows commonly employed. Vibration of a blade sets up fluctuating stresses which can damage or severely reduce the life of the blade.

Various methods exist in order to measure these fluctuating stresses while the turbine is in operation. In one arrangement a plurality of strain gauges are bonded to the turbine blades and the signals from the gauges are transmitted to data acquisition and recording equipment by means of telemetry techniques. This arrangement poses some problems with respect to the life of the strain gauges, the number of strain gauges that may be employed and the economic consideration with respect to the telemetry channels.

A non-contacting method has been proposed for determining turbine blade vibration by using a millimeter wave radar system to direct a narrow beam of electromagnetic energy toward the rotating blade row and analyzing the reflected signal from the blades to detect any abnormal vibration. The present invention utilizes this latter concept in a practical system which determines if any blade is abnormally vibrating, and further identifies which blade or blades are at fault, so that corrective measures may be taken.

SUMMARY OF THE INVENTION

The turbine blade detection system includes a plurality of radar sensors operable to transmit a relatively narrow beam radar signal toward the rotating turbine blades of one or more blade rows. The reflected radar signals from the blades are utilized to derive respective output signals indicative of relative blade movement toward and/or away from the respective radar sensors. In order to determine which of the blades may be vibrating, means are coupled to the turbine to provide an output reference signal for each complete rotation, or partial rotation, of the turbine shaft. Circuitry responsive to the reference signal provides respective running counts indicative of the number of turbine blades which have traversed a reference position to thereby specifically identify the particular blades. Gating means are provided for selectively gating the radar output signal and gating means are provided for selectively gating the running counts. A signal processing means is operable to provide enabling signals at predetermined times to the gating means so as to receive the signals therefrom. The signal processing means is additionally operable to analyze the gated radar output signals to provide an indication if the analyzed signal exceeds predetermined limits. In one embodiment the analyzed signal from each respective blade is averaged over a predetermined number of rotations of the turbine shaft.

BRIEF DESCRIPTION OF THE DRAWINGS

FIG. 1 illustrates a single radar sensor of the prior art for measuring blade vibration;

FIG. 5 is a block diagram illustrating circuitry for obtaining the identification of the rotating turbine blades, in accordance with the present invention;

DESCRIPTION OF THE PREFERRED EMBODIMENT

A suggestion has been made in the prior to use a millimeter wave radar to detect vibrating blades in a gas turbine. As illustrated in FIG. 1, the radar sensor is operable to project an extremely narrow beam radar signal 12 toward the rotating turbine blades 14. The reflected signal 16 therefrom is detected and processed by radar sensor 10 which then derives an output radar signal, designated $F_D$, indicative of relative blade movement toward and/or away from the radar sensor.

Figure 2:
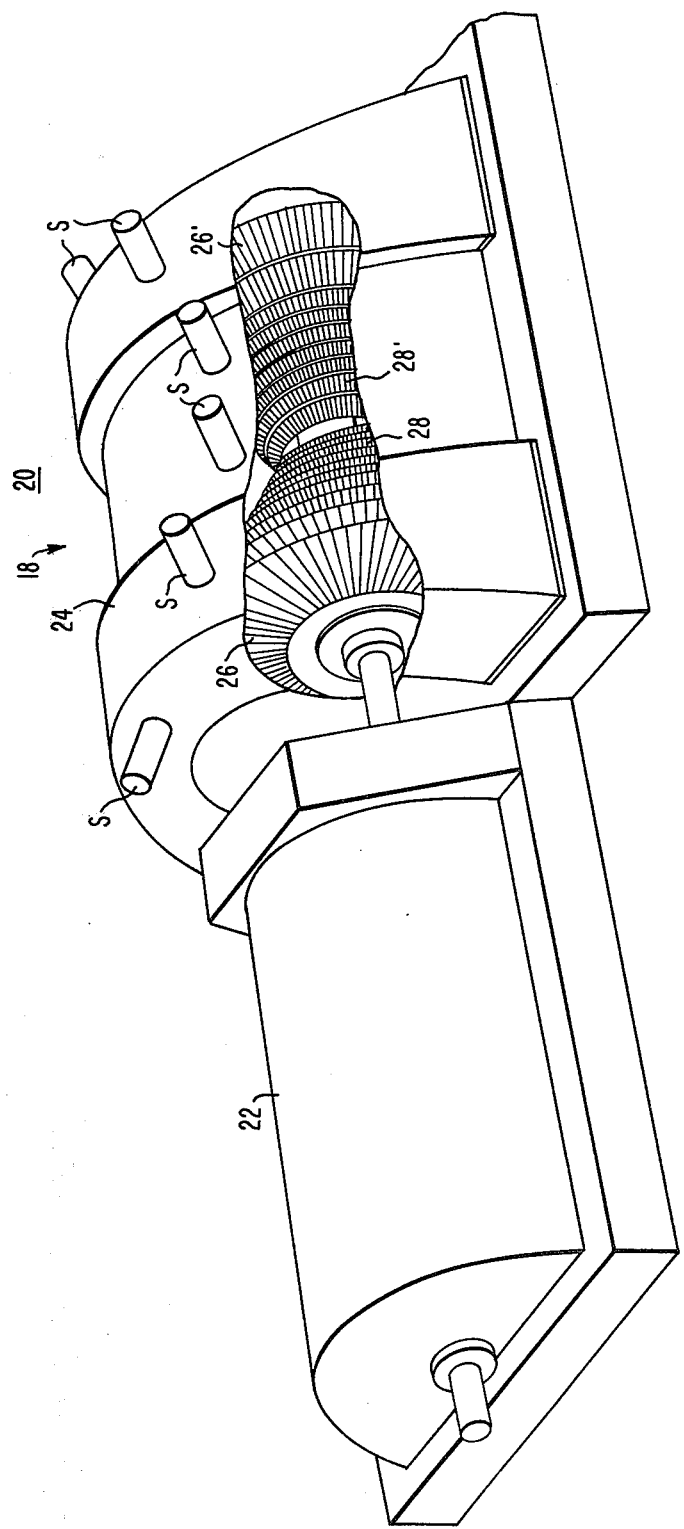
FIG. 2 is a view of a turbine system, with portions broken away, illustrating the placement of radar sensors in accordance with the present invention.

In the present invention, as illustrated in FIG. 2, a plurality of such radar sensors are utilized for determining blade vibration in one or more rotating blade rows. The radar sensors S may be of the millimeter wave type mentioned in FIG. 1 or may be of a higher frequency type such as an optical radar utilizing a coherent light signal as obtained from a laser.

The sensors S are illustrated by way of example as being mounted on the casing of a low pressure steam turbine 18 included as part of a turbine system 20 operable to rotate a generator 22 for the production of electrical energy.

Two sensors can be seen mounted on the outer casing 24 for directing their radar signals toward the last blade row 26 on the generator end as well as two sensors for directing their signal toward the last blade row 26' on the throttle or governor end. By way of further example, two more sensors can be seen mounted on the outer casing 24 for directing their respective radar signals toward respective blade rows 28 and 28'.

Figure 3B:
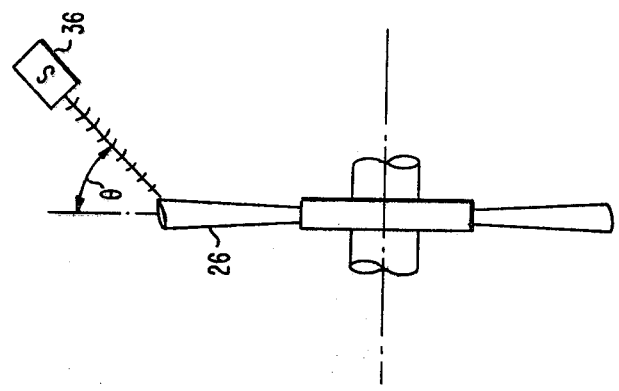
FIGS. 3A and 3B illustrate a plurality of radar sensors in relation to a turbine blade row in accordance with the present invention.
Figure 3A:
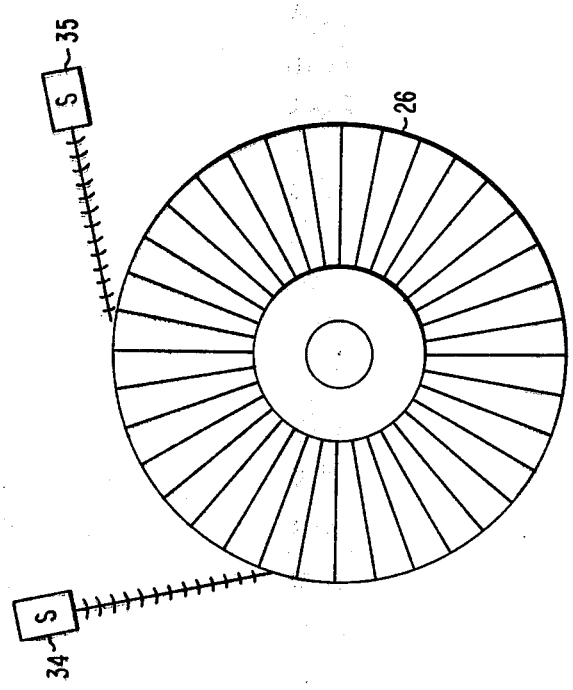

Various orientations of the sensors relative to the blade rows are possible and FIGS. 3A and 3B illustrate two such orientations. In FIG. 3A, two radar sensors 34 and 35 are utilized for obtaining blade vibration data of the same last blade row 26. Radar sensors 34 and 35 are oriented so that their narrow beams are directed toward the blade tips substantially in the general plane of the blade row.

FIG. 3B illustrates a radar sensor 36 oriented so that its narrow beam is at an angle θ with respect to the general plane of the blade row. In turbine systems wherein groups of blades are connected at their tips by means of a shroud, an angular orientation of the radar beams relative to the plane of the blade rows would be utilized.

Figure 4:
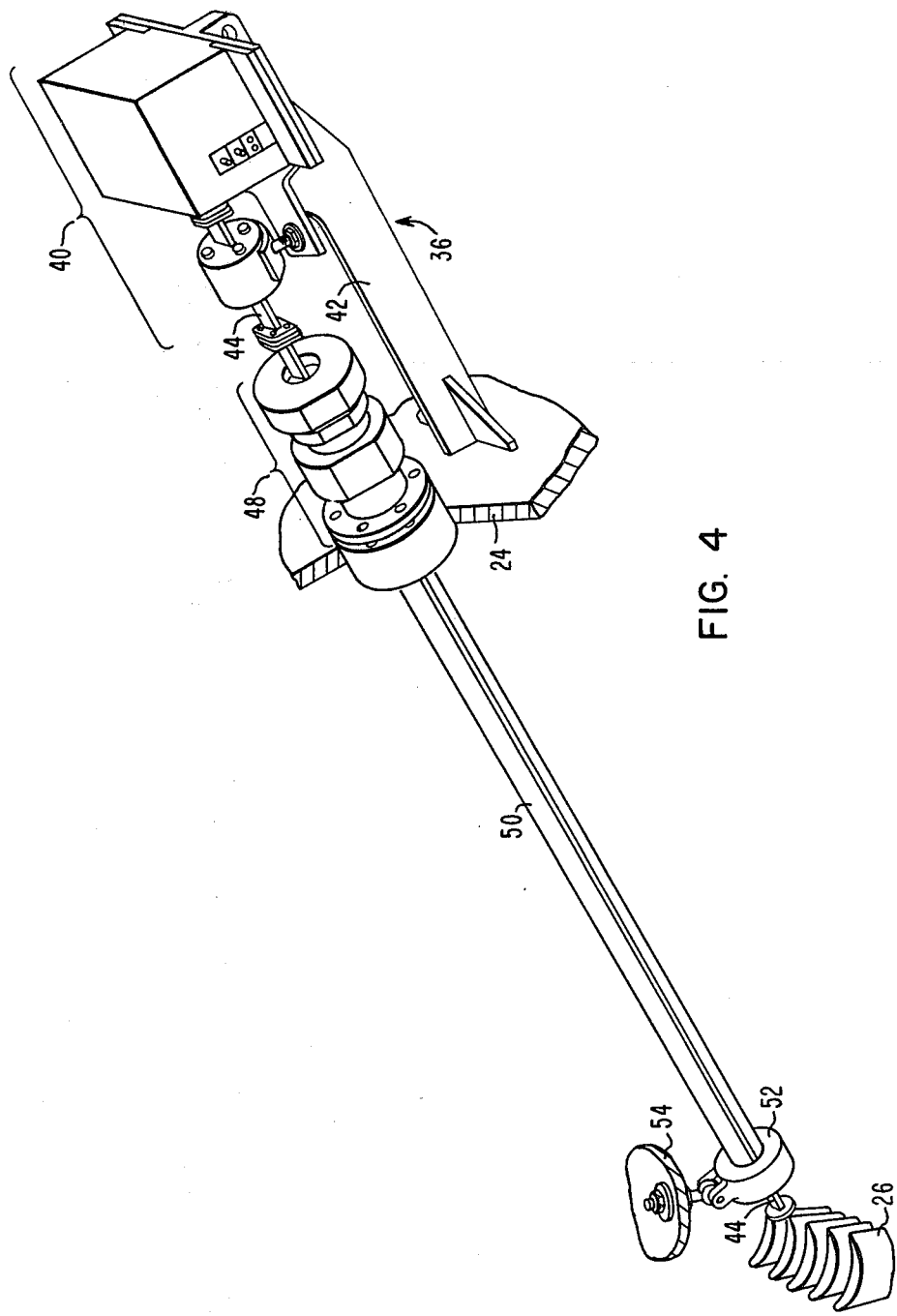
FIG. 4 illustrates a typical mounting of a radar sensor.

A typical mounting of a radar sensor such as 36 is further illustrated in FIG. 4. The electronics portion 40 of the radar sensor 36 is mounted on a bracket 42 secured, such as by welding, to the outer casing 24.

A waveguide 44, for the conveyance of electromagnetic energy extends from the electronics portion 40 down to a position adjacent the blade row 26 and in so doing passes through an aperture in the outer casing 24 with the aperture maintaining pressure integrity by means of a sealing arrangement 48.

Within the turbine, waveguide 44 is enclosed within a waveguide support 50 which in turn is connected to an adjustable support 52 connected to an internal structure of the turbine such as defuser 54, a portion of which is illustrated. The arrangement of FIG. 4 is described in more detail and claimed in copending application Ser. No. 403,432 filed July 30, 1982, and assigned to the same assignee as the present invention.

Having a plurality of radar sensors, means must be additionally provided for determining which of the plurality of blades, if any, are vibrating. Accordingly, means are provided for obtaining a running count of the number of blades which pass a reference position, for each blade row which has a radar sensor or sensors associated with it. Thus, in FIG. 5 means are coupled to the turbine system so as to provide an output reference signal for each 360° of rotation of the blade rows about the turbine's central axis and relative to a reference position. In order to provide this output reference signal a detector 60 is positioned adjacent balance ring 62 connected to the rotor disc 64. Balance ring 62 includes a notch 66 therein which when passing relative to detector 60 will cause an output reference signal therefrom to be supplied on line 68.

A running count of the turbine blades during their rotation is provided by means of one or more blade counting circuits, of which two, 70 and 71 are illustrated. Each blade row that has one or more associated radar sensors will have an assigned blade counting circuit. In a double flow design such as illustrated in FIG. 2, each blade counting circuit may be operable to count not only the blades in one blade row but those in its symmetrical counterpart as well.

In one embodiment, a blade counting circuit such as 70 will include a frequency multiplier 72 of the type which will provide a certain number of output pulses between successive input pulses. For example, if a blade row has X number of blades then frequency multiplier 72 will provide X output pulses on line 74 from one reference pulse to a subsequent pulse supplied on line 68.

The blade counting circuit 70 additionally includes a counter 76 which is operable to count the pulses on line 74 and to provide an indication thereof on line 78, which in a preferred embodiment will be comprised of a plurality of individual leads providing a binary output representation of the particular count. The count will be initiated in response to the reference signal being supplied, via line 80, to the reset R of the counter 76.

It is seen therefore that each time a reference signal is provided by detector 60, a running count will be provided on output line 78 from the blade counting circuit 70 indicative of which of the X number of blades is passing the predetermined reference position. For some designs, it may be desirable to provide more than one radar sensor for a particular blade row. In such instance the first radar sensor output signal may be associated with blade number one whereas a second sensor output would be associated with a different numbered blade. In order to provide an output running count of this different numbered blade, as well as any other blade associated with further radar sensors for that blade row, the blade counting circuit includes offset means in the form of summers 82 and 84 both of which receive the running count appearing on line 78 and modify it by an offset amount supplied on respective lines 86 and 88. When this offset amount is added to the running count appearing on line 78, the offset running count associated with the other radar sensors will appear on respective lines 90 and 92. It is to be understood that an offset circuit may be provided for each radar sensor.

Blade counting circuit 71 will be similar to circuit 70 but will include a frequency multiplier 94 for supplying Y pulses between successive reference signals where Y would be equivalent to the number of blades in a blade row under observation by radar sensors. One or more output lines such as lines 97 and 98 would provide a running blade count for each radar sensor associated with that particular blade row.

If more blade rows with different numbers of blades are to be observed, additional blade counting circuits would be provided. In addition, although FIG. 5 illustrates a reference signal being provided for every 360° of rotation, one or more notches may be provided in the balance ring 62 to provide the reference signals at less than 360° rotations. In such instance, the frequency multiplier output would be proportionally reduced and a divide circuit would be provided in line 80 so that counter 76 would be reset at the appropriate time.

Means are provided for examining a radar signal pertinent to a particular blade for detecting any abnormal vibrations so that corrective measures may be taken. By way of example, and with reference to FIG. 6, let it be assumed that two different blade rows each having a different number of blades, are being examined with two radar sensors per blade row. Thus, the blade counting circuit 70 of FIG. 5 may be utilized to provided running blade counts on two output lines 78 and 79 with the count on line 78 being indicative of the blade being examined by radar sensor 100 and with the count on line 79 being indicative of the blade being examined by radar sensor 101. The blade counting circuit 71 for the other blade row will include two output lines 97 and 98 with the count on line 97 being indicative of the blade being examined by radar sensor 102 and the count on line 98 being indicative of the blade being examined by radar sensor 103.

Gating means are provided for gating the blade count as well as the radar signal and accordingly, gates 110 to 113 govern the gating of the blade counts while gates 114 to 117 govern the gating of the radar signals.

Signal processing means such as computer 120 is operable to provide enabling signals to the first gating circuits 110 through 113 as well as to the second gating circuits 114 through 117 so as to selectively gate the radar signal and its associated blade identification for analysis by the computer 120. The gated blade counts are in a binary form for use by the computer whereas the radar signals are in an analog form. Accordingly, an analog to digital converter circuit 122 is provided for converting these signals to digital form.

Figure 7:
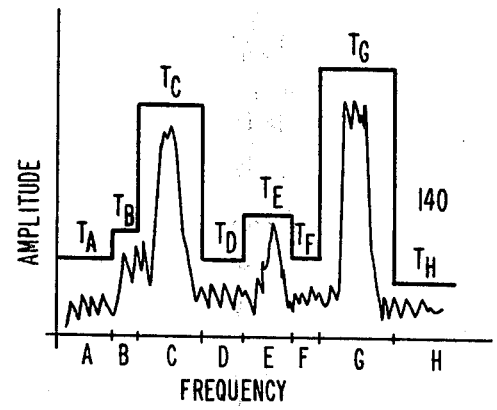
FIG. 7 is a waveform of amplitude versus frequency of a radar sensor signal.

Computer 120 is programmed in a well known manner to perform a Fast Fourier transform on the radar signal so as to obtain, for each blade, a frequency spectrum such as illustrated by waveform 140 in FIG. 7. Amplitude is plotted on the vertical scale of FIG. 7 and frequency on the horizontal scale which is divided into a plurality of frequency ranges A to H. A threshold value is established for each frequency range and these threshold values are designated $T_A$ to $T_H$ for frequency ranges A through H respectively. If the waveform 140 for any particular frequency range exceeds the threshold value established for that range, the computer will output a signal indicating an alarm condition for a particular blade in a particular blade row. In response to this alarm signal an operator may take appropriate action or the signal may be provided to automatic control equipment for governing the turbine.

In a preferred embodiment the computer is operated so as to average the radar signals for each blade over a predetermined number of rotations of the blade row. By way of example, therefore, waveform 140 may represent the average of 10 rotations for a particular blade.

Figure 6:
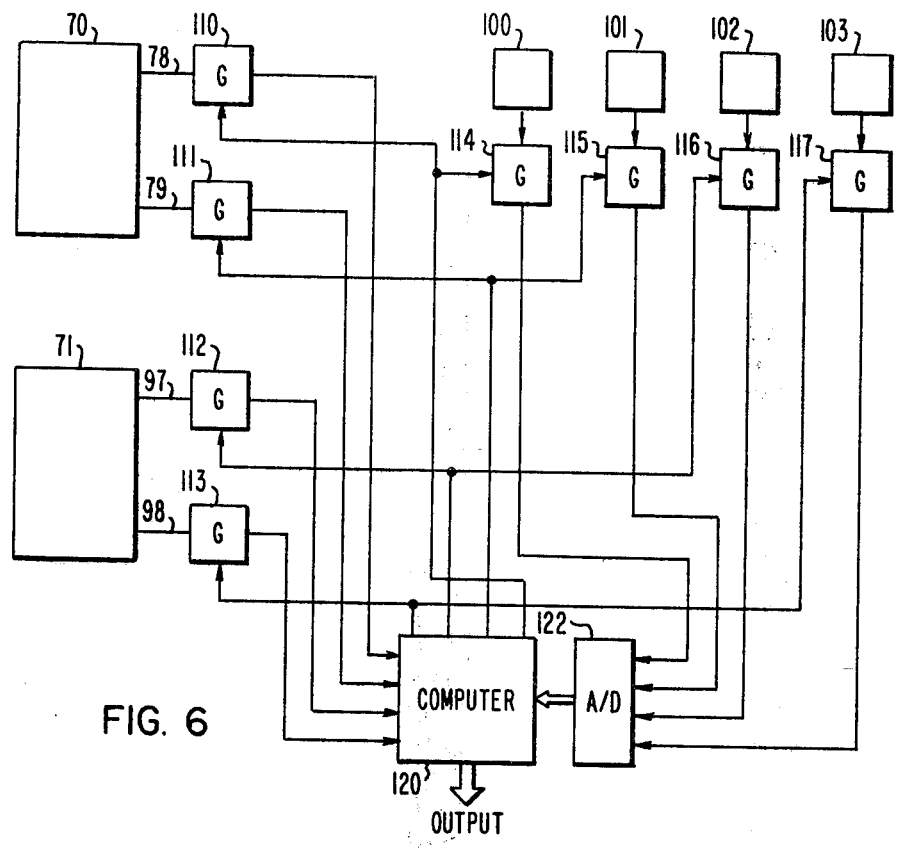
FIG. 6 is a block diagram illustrating the control of signal flow, in accordance with the present invention.

Although in the example given only two blade rows are being examined, each with two radar sensors, it is evident that the basic system illustrated in FIG. 6 can be expanded to accommodate any desired number of blade rows with each having one or more radar sensors. In addition, for a double flow type turbine illustrated in FIG. 2 blade counting circuits 70 and 71 may be additionally used to designate primed counterpart blades as well, in which case additional radar sensors and their respective gating circuits would be provided and controlled by computer 120.

We claim:

1. Vibration detection apparatus for detecting vibration of turbine blades in a turbine system having a plurality of adjacent turbine blade rows, rotatable about a central axis, comprising:
(a) a plurality of radar sensors mounted on said turbine system;
(b) each said radar sensor being operable to transmit a relatively narrow beam radar signal toward a predetermined blade row and to receive a reflected radar signal therefrom to derive an output radar signal indicative of relative blade movement toward and/or away from said radar sensor;
(c) means coupled to said turbine system to provide an output reference signal for each X degrees of rotation of said blade rows about said central axis relative to a reference position, where $X \leq 360°$;
(d) means responsive to said output reference signals for providing, for each blade row having one or more said radar sensors, a running count indicative of the number of turbine blades which have traversed said reference position;
(e) first gating means for gating said running counts;
(f) second gating means for gating said radar output signals;
(g) signal processing means operable to provide enabling signals, at predetermined times, to said first and second gating means and being operably connected to receive said signals so gated; and
(h) said signal processing means being further operable to analyze said gated radar output signals to provide an indication signal if said analyzed signal is out of predetermined limits.

2. Apparatus according to claim 1 wherein:
(a) at least one said blade row includes at least two said radar sensors associated therewith.

3. Apparatus according to claim 1 wherein:
(a) at least one of said radar sensors directs its beam toward a blade row substantially in the general plane of said blade row.

4. Apparatus according to claim 1 wherein:
(a) at least one of said radar sensors directs its beam toward a blade row at an angle to the general plane of said blade row.

5. Apparatus according to claim 1 wherein:
(a) said reference signal is produced for each 360° of rotation of said blade rows about said central axis.

6. Apparatus according to claim 1 which includes:
(a) frequency multiplier means operable to receive said reference signals to provide a preset number of output pulses in response to successive ones of said reference signals; and
(b) counter means operable to count said pulses and provide an output count indication thereof.

7. Apparatus according to claim 6 which includes:
(a) means to modify said count by a predetermined offset value.

8. Apparatus according to claim 6 wherein:
(a) the number of said output pulses is equal to the number of blades in a particular one of said blade rows.

9. Apparatus according to claim 6 which includes:
(a) a plurality of said frequency multiplier means each providing a different number of output pulses in response to successive ones of said reference signals; and
(b) said number of output pulses corresponding to the number of turbine blades in respectively different ones of said blade rows.

10. Apparatus according to claim 1 wherein:
(a) said signal processing means is operable to average over a predetermined number of rotations of said blade rows, the output radar signal associated with a particular one of said turbine blades.

11. Apparatus according to claim 1 wherein:
(a) said signal processing means is operable to obtain the respective frequency spectrums of said output radar signals and to compare, for each said spectrum, the amplitude thereof in a plurality of frequency ranges, with predetermined threshold values established for said ranges.

* * * * *